May 5, 1942.  H. FISCHER  2,281,685

INJECTION ENGINE

Filed April 24, 1941

Inventor:
Hans Fischer.
By Brown, Jackson, Boettcher & Dienner
Attys.

Patented May 5, 1942

2,281,685

UNITED STATES PATENT OFFICE 2,281,685

INJECTION ENGINE

Hans Fischer, Yonkers, N. Y., assignor to Lanova Corporation, Long Island City, N. Y., a corporation of Delaware Application April 24, 1941, Serial No. 390,055

1 Claim. (Cl. 123—32)

This invention relates to injection engines, and has to do with engines of the supplementary chamber solid injection type, in which the fuel is injected mechanically and without the aid of an air blast.

Engines of the character referred to, in which relatively high pressure is created in the supplementary chamber or cell by relatively rapid combustion therein, with resulting ejection of a high pressure high velocity blast therefrom into the combustion chamber to assist there in dispersion and combustion of the injected fuel are known, such engines being commonly designated energy cell engines.

The primary object of my invention is to provide an engine of the character referred to suitable for airplane use and analogous purposes, capable of operating at increased speed and efficiency compared to known engines of this type. More specifically, I so relate the injection nozzle, the supplementary chamber or energy cell and the combustion chamber as to utilize most efficiently a blast ejected from the supplementary chamber to disperse the injected fuel spray and mix it rapidly and uniformly with the available combustion supporting air, thus assuring a high rate of combustion and early completion of combustion, both essential to high speed and efficiency. Further objects and advantages of my invention will appear from the detailed description.

Figure 1:
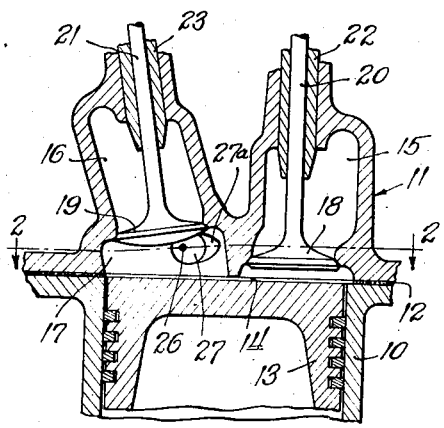
Figure 1 is an axial sectional view through the upper end portion of the cylinder and the cylinder head of an engine embodying my invention, showing the portions thereof with which my invention is concerned, certain parts being shown in elevation.

The engine of my invention comprises a cylinder 10, closed at its outer end by a head 11 bolted or otherwise suitably secured in position, with an intervening gasket 12, and a piston 13 operating in the cylinder. When piston 13 is in its innermost or top dead center position shown in Figure 1, which is its position of maximum compression, clearance space 14 between the top of piston 13 and the underface of head 11 preferably is only that required for mechanical reasons, and is substantially equal to the thickness of gasket 12.

The head 11 is provided with two passages 15 and 16 respectively opening downward into clearance space 14 and through the roof of combustion chamber 17 formed in the under side of head 11. Passages 15 and 16 are controlled by valves 18 and 19, respectively, stems 20 and 21 of which operate through guide sleeves 22 and 23 appropriately mounted in head 11. Either of the passages 15 and 16 may be the exhaust passage, the other being the inlet passage. If it be assumed that passage 15 is the exhaust passage, then passage 16 becomes the inlet passage and these passages are controlled by inlet and exhaust valves 19 and 18, respectively, which valves, in practice, have associated therewith suitable means for operating them in proper timed relation, as is well known.

The axis of valve 19 is inclined downward and inward of the cylinder, as shown, and the axis of combustion chamber 17 is similarly inclined. The head of valve 19 constitutes the major portion of the roof of combustion chamber 17, the roof of which is inclined from its inner side downward to its outer side, this chamber correspondingly decreasing in height outward. The combustion chamber 17 is of circular shape in a plane perpendicular to its axis, being elliptical in plan, due to its inclination, though it may be considered as substantially circular in plan. Preferably combustion chamber 17 overlies and opens directly downward into cylinder 10, adjacent one side thereof, and passage 15 overlies and opens downward directly into cylinder 10, adjacent the opposite side thereof, as shown.

Head 11 is further provided with a supplementary chamber 25 opening into combustion chamber 17 at the inner or higher side thereof, through a restricted orifice 26 and a funnel-like passage 27 leading to orifice 26 and flaring inward toward combustion chamber 17. An injection nozzle 28 is mounted in head 11 in a suitable known manner. Nozzle 28 is provided at its inner end or tip with a port disposed to inject a spray s of fuel along line *f—f* into passage 27 and orifice 26. The supplementary chamber 25 is shown as being of substantially ovoidal shape and is formed in part by a removable plug 29 screwed or otherwise suitably secured in head 11, the inner end of this plug being suitably recessed to define the outer portion of the interior of chamber 25. The inner side of passage 27 is extended at 27ᵃ and is there tangent to the inner side of combustion chamber 17.

The line of injection *f—f* forms a chord of combustion chamber 17 and is disposed adjacent the inner or higher side thereof. Orifice 26 and passage 27 are substantially coaxial. Axis *g—g* of orifice 26 also forms a chord of combustion chamber 17, lying between the inner side thereof and the line of fuel injection *f—f* and intersecting the surrounding wall of combustion chamber 17 at *h* at about the midportion of the arc *iko* intercepted by the line of injection *f—f*. Preferably, the injection nozzle port and the orifice 26 are so related that the lines *f—f* and *g—g* intersect in the orifice 26 and there define an interior acute angle. The injection nozzle port is spaced such a distance from passage 27 and orifice 26 as to assure entry of the injected fuel into supplementary chamber 25 in proper amount to form with the air therein a quick burning fuel-air mixture.

Figures 3, 3A:
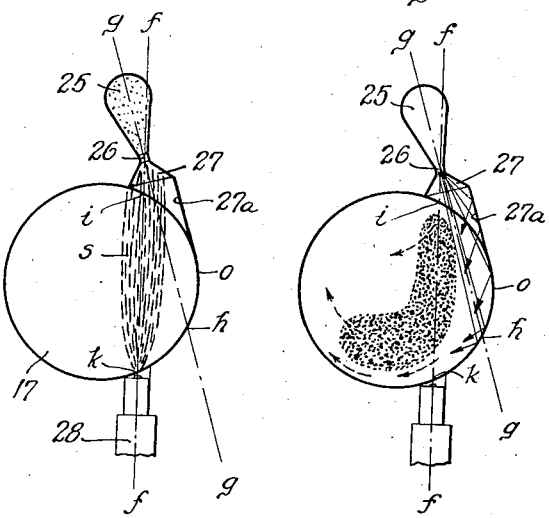
Figure 3 is a diagrammatic plan view of the combustion chamber and the supplementary chamber and the injection nozzle, showing the conditions which obtain shortly after injection of fuel starts and as the piston approaches its top dead center position.
Figure 3A is a view similar to Figure 3 but showing the conditions which obtain incident to combustion in the supplementary chamber.

During the compression stroke of the piston 13 the displaced air is forced into combustion chamber 17 and through passage 27 and orifice 26 into supplementary chamber 25. The pressure in both chambers increases as the compression stroke of the piston proceeds, but remains higher in chamber 17 than in chamber 25 due to the throttling effect of orifice 26, which is properly proportioned to that end. As the piston 13 approaches top dead center position injection of fuel begins, as indicated in Figure 3. The fuel is injected along line *f—f* in the form of an effectively broken up spray *s* having a small dispersion angle and forming, with a small amount of the air in chamber 17, a rich slow burning fuel-air mixture. The tip of the spray *s* enters passage 27 and the injected fuel is directed thereby through orifice 26 into supplementary chamber 25 in proper amount to form therein a quick burning fuel-air mixture, indicated by the stippling in Figure 3.

At about from 4° to 6° before top dead center position of the piston 13, which latter is its position of maximum compression, the rich fuel-air mixture in combustion chamber 17 is ignited by the heat of compression, and burns therein relatively slowly, injection of fuel continuing until about top dead center position of the piston, at which time fuel injection is terminated.

At about top dead center position of piston 13, the quick burning fuel-air mixture in supplementary chamber 25 is ignited, by flame propagation from chamber 17 or by increase in pressure in chamber 25 incident to pressure increase in chamber 17, or by both. The combustion in chamber 25 is extremely rapid and causes an abrupt rise of pressure therein to a relatively high value which may be twice the pressure then obtaining in combustion chamber 17. The relatively high pressure in supplementary chamber 25 causes the ejection therefrom, at about from 4° to 6° after top dead center position of piston 13, of a high pressure high velocity stream of incandescent gases, in the nature of a blast, through orifice 26 and passage 27 along line *g—g* into combustion chamber 17. That occurs while piston 13 is substantially on the dwell of its compression stroke, ready to start down on its working stroke, and the body of air effective for supporting combustion of the fuel is confined within the combustion chamber 17. The blast of gases strikes the surrounding wall of combustion chamber 17, at the inner or higher side thereof, and is in large part deflected generally toward the opposite outer or lower side of that chamber, as indicated by the arrows in Figure 3A. The deflected gases travel toward the outer side of combustion chamber 17 at high velocity and act effectively to disperse the fuel spray for substantially its full length and to drive the fuel particles into, and quickly and thoroughly mix them with, the unconsumed air in combustion chamber 17. Some of the gases ejected from supplementary chamber 25 tend to flow along the surrounding wall of the combustion chamber 17 and to displace the end portion of the spray *s* adjacent the tip of nozzle 28 circumferentially of that wall and toward the center of chamber 17, as indicated in Figure 3A. That is advantageous as assuring that that portion of the spray, which is the richest, will be dispersed and forced into and mixed with an adequate volume of the air to assure rapid and complete combustion of the fuel therein. In general the spray *s* is dispersed and driven away from the cold surrounding wall of chamber 17 into the unconsumed air within that chamber practically instantaneously, while piston 13 is on the dwell of its compression stroke or about to start down on its combustion stroke. More specifically, the fuel spray is driven away from the cold surrounding wall of chamber 17 into the central portion of that chamber, where a large portion of the fuel is quickly burned. The portion of the blast traveling about the wall of chamber 17 then tends to create rotation of the contents thereof, causing outward travel of any unburned fuel particles toward the surrounding wall of chamber 17, through the unconsumed air therein. That causes burning of such fuel particles before they reach the wall of the combustion chamber. That results in greatly accelerated combustion, at that time, rendering possible materially increased speed of operation while assuring completion of combustion within the first twenty or thirty degrees of travel of the piston on its combustion or working stroke. The net result is that the engine of my present invention shows a marked increase in speed and operating efficiency over the above referred to known engines of this general type, as tests have demonstrated.

Figures 4, 4A:
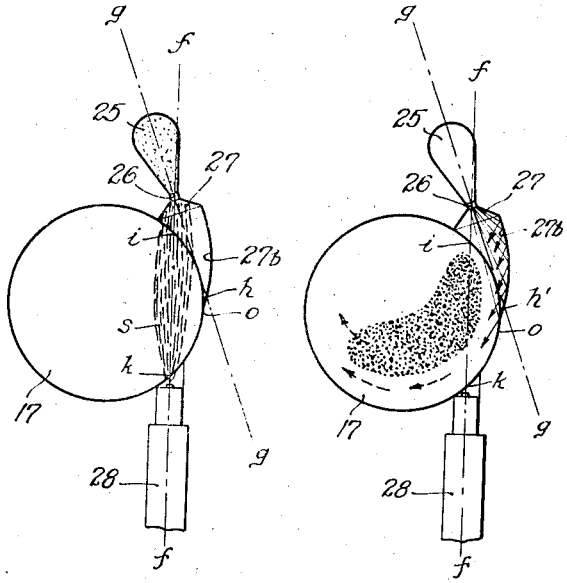
Figure 4 is a view similar to Figure 3 showing a modification of the funnel-like passage leading to the supplementary chamber.
Figure 4A is a view similar to Figure 3A of the modification of Figure 4.
Figure 2:
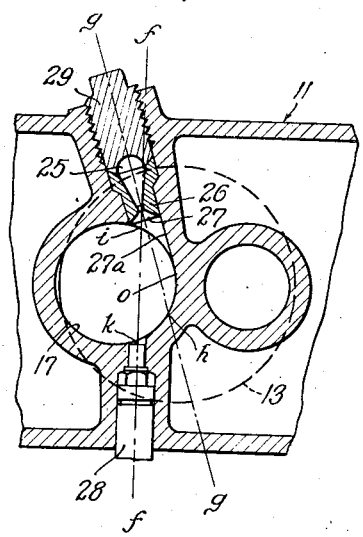
Figure 2 is a sectional view taken substantially on line 2—2 of Figure 1, with the valves omitted for clearness of illustration.

In Figures 4 and 4A the inner wall of passage 27 is curved inward at 27ᵇ and is substantially tangent to the inner side of combustion chamber 17, and the axis *g—g* of orifice 26 is tangent to arc *iko* and intersects curved portion 27ᵇ of passage 27 at *h'*. The blast from supplementary chamber 25, in Figures 4 and 4A is in general deflected more across the combustion chamber, with less rotary motion of the contents thereof, than in Figures 3 and 3A, which contributes somewhat to more rapid dispersion of the fuel spray and more rapid mixing of the fuel particles with the air. Otherwise the form shown in Figures 4 and 4A is similar to that shown in Figures 3 and 3A and further description thereof is not necessary.

The major portion of the fuel is burned in the inner and central portions of combustion chamber 17, the amount of air required to support combustion diminishing as the fuel travels toward the lower or outer side of that chamber. By having chamber 17 of decreasing height outward I provide adequate air at the inner portion thereof to assure ignition and combustion of the rich-fuel air mixture of the spray s, while also providing adequate air in those portions of chamber 17 into which any remaining fuel is driven to assure rapid and thorough combustion therein of such fuel. That arrangement of the combustion chamber, while preferred, is not essential to the broader concept of my invention, which comprises so relating the energy cell to the combustion chamber and the injected fuel spray that the latter does not contact the surrounding cold wall of the combustion chamber and is dispersed into the air in that chamber in a manner to obtain rapid and thorough combustion of the fuel, as above described.

It will be understood that the construction of the engines illustrated herein is by way of example only and that modifications thereof may be resorted to without departing from the field and scope of my invention, and I intend to include in this application all such variations as fall within the scope of the appended claim.

I claim:

In an injection engine, a cylinder and a piston operating therein, a combustion chamber opening into said cylinder, a supplementary chamber opening into said combustion chamber between a diameter and one side thereof through a restricted orifice and a funnel-like passage flaring from said orifice toward said combustion chamber, said passage having a wall merging with said side of said combustion chamber substantially tangentially thereof, and an injection nozzle having a port disposed to inject a spray of fuel across said combustion chamber and into said passage on a chord adjacent said one side of said combustion chamber, said nozzle being timed to effect said injection before top dead center piston position, the distance between the port of said nozzle and said orifice and passage being such as to assure entry of injected fuel into said supplementary chamber in proper amount to form with the air therein a quick burning fuel-air mixture effective for producing within said supplementary chamber incident to combustion therein relatively high pressure effective for ejecting therefrom after top dead center piston position a high-pressure high-velocity blast of gases through said orifice and passage, said orifice and passage being disposed to discharge said blast into said combustion chamber on a chord intersecting said first-named chord and traversing said combustion chamber nearer said combustion chamber side than said first-named chord, whereby said blast impinges upon said combustion chamber side and is deflected thereby into a peripheral sweep toward the opposite side of the combustion chamber.

HANS FISCHER.

DISCLAIMER 2,281,685.—*Hans Fischer*, Yonkers, N. Y. INJECTION ENGINE. Patent dated May 5, 1942. Disclaimer filed November 15, 1944, by the assignee, *Lanova Corporation*.

Hereby enters this disclaimer to the claim in said patent.

[*Official Gazette December 5, 1944.*]